(12) United States Patent
Liu et al.

(10) Patent No.: US 6,404,504 B2
(45) Date of Patent: Jun. 11, 2002

(54) METHOD AND APPARATUS FOR MEASURING FLYING HEIGHT OF THE SLIDER AND IN-SITU MONITORING A SLIDER-DISK INTERFACE

(76) Inventors: Bo Liu, Blk 401, Pandan Gardens, #17-01, Singapore, 600401; Yaolong Zhu, Blk 240, #12-243 Bukit Batok East Ave 5, Singapore, 650240; Teck Seng Low, 6 Hacienda Grove, #02-05 The Hacienda, Singapore, 457912, all of (SG)

( * ) Notice: Subject to any disclaimer, the term of this patent is extended or adjusted under 35 U.S.C. 154(b) by 0 days.

(21) Appl. No.: 09/951,724

(22) Filed: Sep. 14, 2001

Related U.S. Application Data

(63) Continuation of application No. 09/196,225, filed on Nov. 20, 1998.

(30) Foreign Application Priority Data

Nov. 20, 1997 (SG) .............................................. 9704108

(51) Int. Cl.[7] .............................................. G01B 11/02
(52) U.S. Cl. ..................................................... 356/507
(58) Field of Search ................................. 356/507, 345, 356/357

(56) References Cited

U.S. PATENT DOCUMENTS 5,473,431 A * 12/1995 Hollars et al. .............. 356/355

* cited by examiner

*Primary Examiner*—Frank G. Font
*Assistant Examiner*—Phil S. Natividad
(74) *Attorney, Agent, or Firm*—Dykema Gossett PLLC

(57) ABSTRACT

A method and apparatus for measuring the flying height of a slider above a disk surface and in-situ monitoring the slider disk interface comprising the steps of: providing a beam of light; providing a slider disk interface comprising a disk having a substantially transparent substrate and a thin film layer, a slider for carrying a read/write element, the slider having a reflective surface; and an air bearing having a thickness d3 for supporting the slider above the disk; directing the beam of light to the slider disk interface through the disk, the thin film layer, the air bearing and then to the reflective surface of the slider; and measuring one of the intensity and phase information of the light reflected from the slider disk interface to provide an indication of the thickness d3 of the air bearing and/or of the thin film layer.

17 Claims, 9 Drawing Sheets

METHOD AND APPARATUS FOR MEASURING FLYING HEIGHT OF THE SLIDER AND IN-SITU MONITORING A SLIDER-DISK INTERFACE

This is a continuation of application Ser. No. 09/196,225, filed Nov. 20, 1998, still pending.

THIS INVENTION relates to a method and apparatus for measuring flying height and more particularly for measuring the clearance of a magnetic head slider above a disk surface by using an optical interference mechanism. This invention also relates to a method and apparatus for measuring the thickness change of a thin film between the slider and disk, the thin film being located on either the air-bearing surface of the slider or on the disk surface.

The magnetic disk drive industry has constantly been attempting to achieve higher recording densities. One of the most effective and critical parameters related to recording density is the flying height of the magnetic head slider above the disk surface. The flying height has been reducing over recent years and is presently down to about 25 nm. There is also a trend towards proximity contact recording and contact recording. In proximity contact recording the flying height is usually less than 25 nm and, for example, would be in the region of 15 nm. For contact recording, the flying height approaches zero, the magnetic recording head of the slider actually making contact with the disk surface. Wear and friction will occur as a result of contact recording and proximity contact recording when the magnetic head slider and the disk surface come into contact with one another. Accordingly, as flying heights are reduced, it becomes important to measure accurately the flying height. However, the measurement of such a small flying height is very difficult.

Wear and friction also occur during the slider take-off and landing process, that is, the contact start-stop process. In fact, the typical failure mechanism for a thin film disk, subjected to contact start-stop by a ceramic slider, is lubricant depletion and degradation, followed by carbon wear. Accordingly, the in-situ measuring and monitoring of lubricant film thickness and lubricant transferring process between the air bearing surface of a slider and a disk surface are also becoming very important, especially for high-end magnetic disk drive design.

Optical interferometry has been applied to measure the flying height of magnetic head sliders for many years. Monochromatic fringe counting techniques, using a white light source and an optical grating, provide an accuracy of 0.15 $\mu$m over the range from 1 to 3 $\mu$m. White light interferometry, provides an accuracy of 50 nm for flying heights below 1 $\mu$m, but at a spacing of less than 150 nm, the colours wash together and cannot be interpreted with reasonable accuracy.

Small spacing measurement techniques based on the photo-electrical conversion of interference intensity have been proposed. One example is a paper "A Visible Laser Interferometer for Air Bearing Separation Measurement to Submicron Accuracy" by A. Nigam (ASME Journal of Tribology Vol.104, PP60–65, January 1982). In the paper, Nigam employs a He-Ne laser as a light source and two photo-detectors. The flying height of the slider was measured with an accuracy of 5 nm and spacing fluctuation resulting from suspension resonance up to 2 kHz range.

Another method to measure slider-disk spacing is disclosed in Ohkubo et al's paper "Accurate Measurement of Gas-lubricated Slider Bearing Separation Using Visible Laser Interferometry" (ASME Journal of Tribology, Vol. 110 PP148–155, January 1988). As described in the paper, the system also uses a He-Ne laser, and two photo-detectors of which one is a reference photo-detector which detects variations in the intensity of the laser source, and the other is a measurement photo-detector used for measuring intensity of the fringes. Consequently, they could successfully measure the static and dynamic flying height of the slider with an accuracy of 1.3 nm on the range of the normalised light intensity range 0.2–0.7, and a frequency range of around of 100 kHz. Although the Ohkubo et al system eliminates some measurement error, it has the following disadvantages: the slider must be landed on the glass disk to determine the fringe order for the spacing calculation; at the points where the light intensity is a minimum or maximum, the slope of the interferometric intensity Vs spacing curve becomes zero. At these points, the noise in electronic intensity measurement causes a large error in spacing measurement relative to the other spacing which are not directly on the fringe maximum or minimum; and the effects of the phase shift of the reflective light from the slider surface on the flying height of the slider are not considered.

Another method to measure slider/disk spacing is disclosed in Muranushi et al's paper "The Ultraviolet Light Interference Method to Measure Slider Flying Heights" (Advances in Information Storage Systems, Vol.5, PP435–445, 1993). The tester uses a Xenon lamp source with a monochrometer which produces monochromatic light having a minimum wavelength of about 200 nm, and photo diode arrays. It can measure a 50 nm flying height within an error of less than 1 nm, and a slider's dynamic motion in the 0–100 kHz frequency range. Measurement of the dynamic motion of the slider is made of the dynamic change in interference light intensity at the middle point between the contiguous fringe-peaks by changing the light wavelength. Whilst the measurement sensitivity of the flying height is very high, so that the accuracy is good, this tester has the following disadvantages: at different flying heights of the slider, different light wavelengths must be used, and the different refraction and extinction coefficients must be determined before measurement; and this method cannot measure the flying height when the flying height moves to zero.

In a method disclosed by Lacey et al (U.S. Pat. No. 5,457,534) an interferometer uses a mercury arc lamp light resource and three detectors with separate wavelengths so that three separate interference fringe signals are generated. The system has the following advantages: at the points where the fringe intensity is a minimum or maximum for one wavelength of light, the slopes of the other two wavelength interferometric intensity Vs spacing curve are still high; and the fringe order is easily determined. The disadvantages are: the optical constant of the slider materials must be measured by an additional ellipsometer; and the sensitivity is quite low when the flying height moves to zero.

The method disclosed by Tadashi Fukuzawa et al (U.S. Pat. No. 5,475,488) measured the flying height by using a white light source and a colour CCD camera. Tentative refraction coefficients and extinction coefficients representative of colours are substituted in theoretical equations expressing the relationship between interference light intensity and flying height, thereby optimising the parameters by non-linear regression. This method need not pre-measure the optical constant of the slider, but still cannot measure the flying height when the flying height becomes less than 25 nm and even to zero.

In summary, using the above light intensity techniques for measuring the flying height, there is a basic limitation: the sensitivity becomes very low when the flying height approaches zero.

In more recent products, ellipsometry is used to measure the flying height of the slider. One example of this method is disclosed in U.S. Pat. No. 5,557,399 to Peter de Groot. Another example is disclosed by Christoher Lacey in Phase Metrics. "Full-Surface Detection of Flying Height with In-Situ N and K Measurement" (1996). The advantages of this type of apparatus are that it is capable of measuring the flying height down to zero with high sensitivity, and measuring the optical constant of the slider simultaneously.

The ellipsometry techniques for measuring flying height are highly accurate but these techniques employ a glass disk instead of a real magnetic recording disk. In reality, the interface between a slider and a real magnetic recording disk is quite different from the interface between a slider and a glass disk.

Many techniques have been used to examine thin films disks for lubricant depletion, accumulation, degradation, and/or carbon wear, such as Fourier-transform infrared spectroscopy (FTIR), Electron spectroscopy for chemical analysis (ESCA), and ellipsometer. One example is provided by a paper entitled "Optical Surface Analysis of the Head-disk-interface of Thin film disks", by Steven W. Meeks, Walter E. Weresin, and Jal J. Rosen (Tran. of ASME, Journal of Tribology, Vol. 117, January 1995. As described in the paper, a polarized light beam illuminates a surface of a thin film disk, reflected polarized light intensity and scattered light intensity will provide the thickness of the lubricant film and carbon film. The advantage of this kind of tester is its capability of real-time measurement of the lubricant thickness and the variation for the he thickness. The disadvantages of the tester is that the slider-disk interface is not observed directly, and the lubricant depletion can only be monitored on the same track when the slider is not flying over the testing points. It cannot measure the transferring process of the lubricant between the slider and the disk surface.

It may be concluded, therefore, that known flying height testers, and lubricant film thickness testers do not provide coupling information concerning the lubricant film and the slider-disk spacing. So far, there is no method or apparatus for in-situ monitoring lubricant film thickness and lubricant transferring process by directly observing a slider-disk interface. Nor is there a method or apparatus for real-time measuring both of lubricant thickness and of slider-disk spacing. Nor is there a method and apparatus for measuring the lubricant film accumulation between the slider air bearing surface and the disk surface before and during the contact start stop process.

There is, therefore, a need for a method and apparatus for in-situ monitoring of the slider-disk interface directly. This invention seeks to provide such a method and apparatus. Some of the difficulties which have occurred in the prior art of the flying height testers and lubricant film testers are overcome by the present invention.

The present invention seeks to provide a method and apparatus of accurately measuring flying heights of 25 nm and less.

A further aspect of the present invention seeks to measure accurately the thickness change of the thin films between the slider and disk and on the air-bearing surface of the slider or disk surface.

Another aspect of the present invention seeks to monitor the transferring process of the lubricant between disk surface and the air-bearing surface of the slider.

Accordingly, the present invention provides a method of in-situ monitoring of a slider disk interface comprising the steps of: providing a beam of light; providing a slider disk interface comprising a disk having a substantially transparent substrate and a thin film layer, a slider for carrying a read/write element, the slider having a reflective surface, and an air bearing having a thickness d3 for supporting the slider above the disk; directing the beam of light to the slider disk interface through the disk, the thin film layer, the air bearing and then to the reflective surface of the slider, and measuring one of the intensity and phase information of the light reflected from the slider disk interface to provide an indication of the thickness d3 of the air bearing and/or of the thin film layer.

A further aspect of the present invention provides a disk for use in the measurement of the flying height of a slider and/or monitoring a slider disk interface comprising a transparent disk as a substrate and a thin film layer formed on one side of the disk adjacent the slider.

Preferably, the thin film layer comprises a protective layer having a thickness d1 and a lubricant layer having a thickness d2, with the same materials and thicknesses as a real magnetic recording thin film disk, and with the same fabrication process as that of a magnetic recording thin film disk.

In order that the present invention may be more readily understood, embodiments thereof will now be described, by way of example, with reference to the accompanying drawings, in which:

FIG. 2($b$) is a schematic cross-section through a typical thin-film disk with a glass substrate;

FIG. 2($c$) is a schematic cross-section through a disk embodying the present invention;

FIG. 2($d$) is a schematic cross-section through another disk structure embodying the present invention for measuring the wear of a protective layer and the flying height of the slider;

FIG. 2($e$) is a schematic cross-section through another disk structure embodying the present invention for measuring the transference of lubricant;

FIG. 2($f$) is a schematic cross-section through a further disk structure embodying the present invention;

FIG. 2($g$) is a schematic cross-section through another disk structure embodying the present invention;

Figure 1:
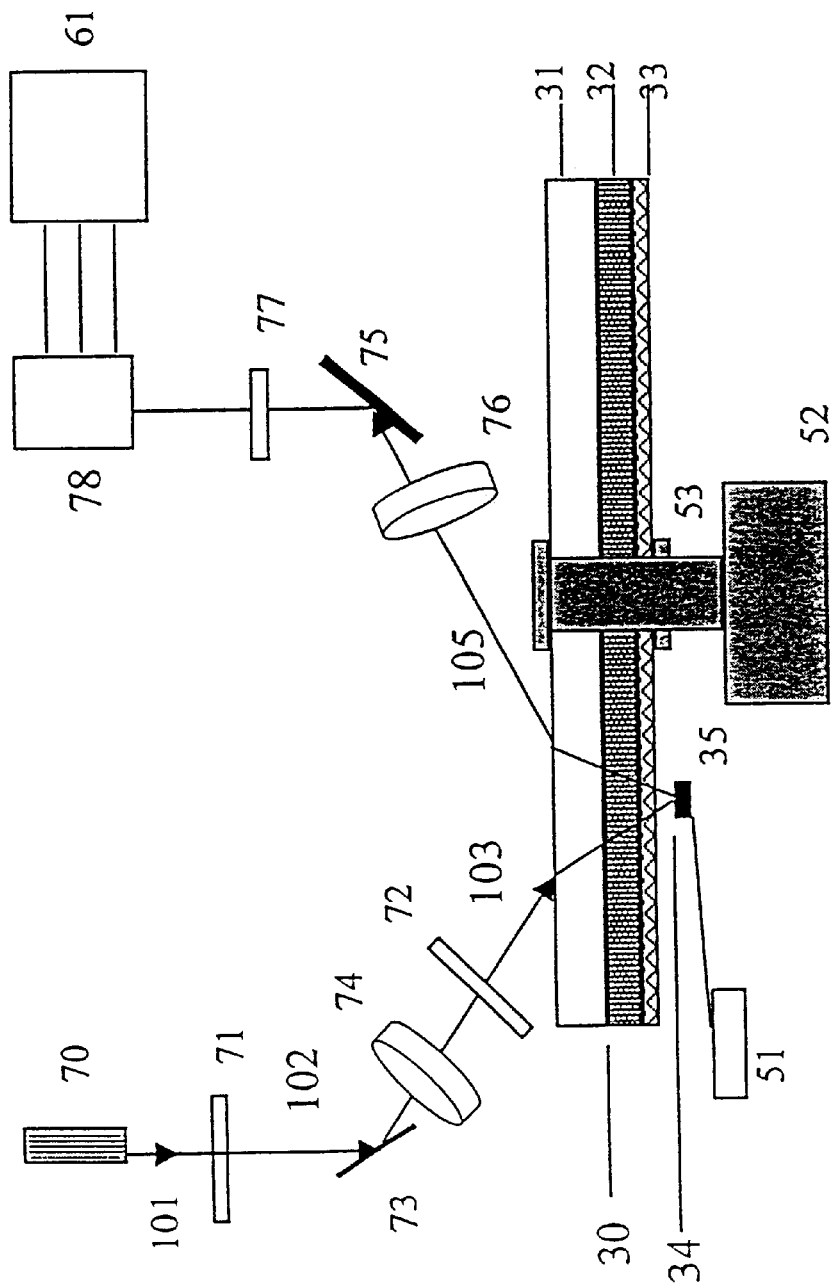
FIG. 1 is a schematic diagram showing the configuration of a measurement apparatus embodying the present invention.

FIG. 1 depicts a schematic configuration from the presently preferred embodiment of the present invention, although, of course, other embodiments are possible without departing from the spirit and scope of the present invention. An actuator 51 moves a magnetic head slider 35 to allow it to access a disk 30. The disk 30 is supported by a spindle 53 and rotated by a motor 52. A light source 70 provides light 101 which is either monochromatic light or multiple wavelength monochromatic light. The light source 70 comprises a laser, mercury arc lamp, or Xenon lamp with monochrometer. The light 101 passes through a polarizing element 71 to convert unpolarized light to linearly polarized light 102. A mirror 73 directs the light 102 to a focusing lens 74 and passes through a polarizer 72 and thence towards the first surface disk 30 at an angle. The plane of incidence of the beam preferably defines a polarization vector p and a corresponding orthogonal vector s. Preferably, the polarization of light beam 103 includes both s- and p-type polarizations. The disk 30 comprises a substrate layer 31, a protective layer A2, and a lubricant layer 33: there is an air gap 34 between the disk 30 and the slider 35: The slider disk interface therefore comprises the disk 30, the air gap 34 and the slider 35. The light 105 reflected from the slider disk interface passes through a lens 76 and is then directed by a mirror 75 to a compensator 77 and then enters a detector component 78 for measuring the light intensity of the light in each polarisation, as well as for determining the phase information of the reflected light.

The signals from the detector component 78 are inputted into data processing equipment 61. The flying height d3, the lubricant film thickness d2 and protective layer thickess d1 are calculated from the input signals in the data processing equipment 61 as described later.

Figure 2:
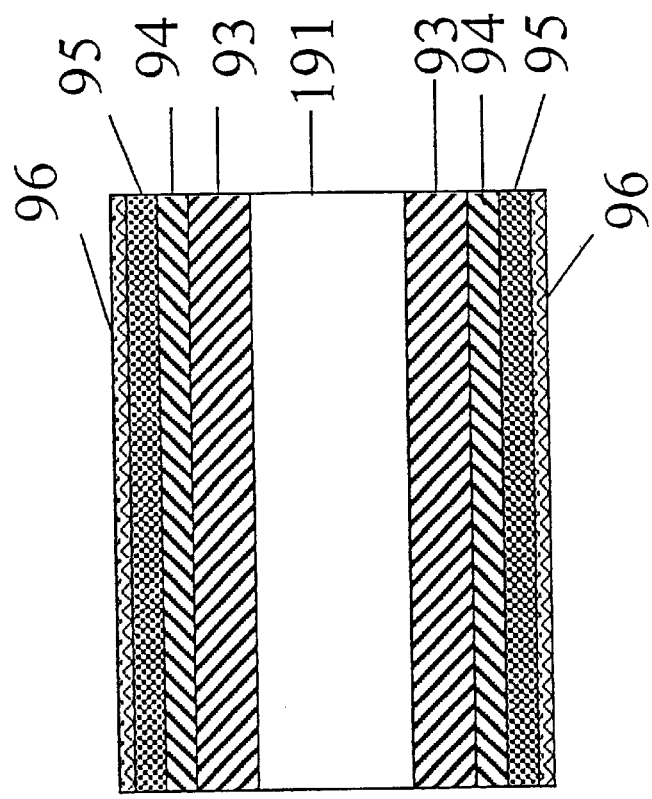
FIG. 2($a$) is a schematic cross-section through a typical thin-film disk with a Al—Mg substrate.
Figure 2:
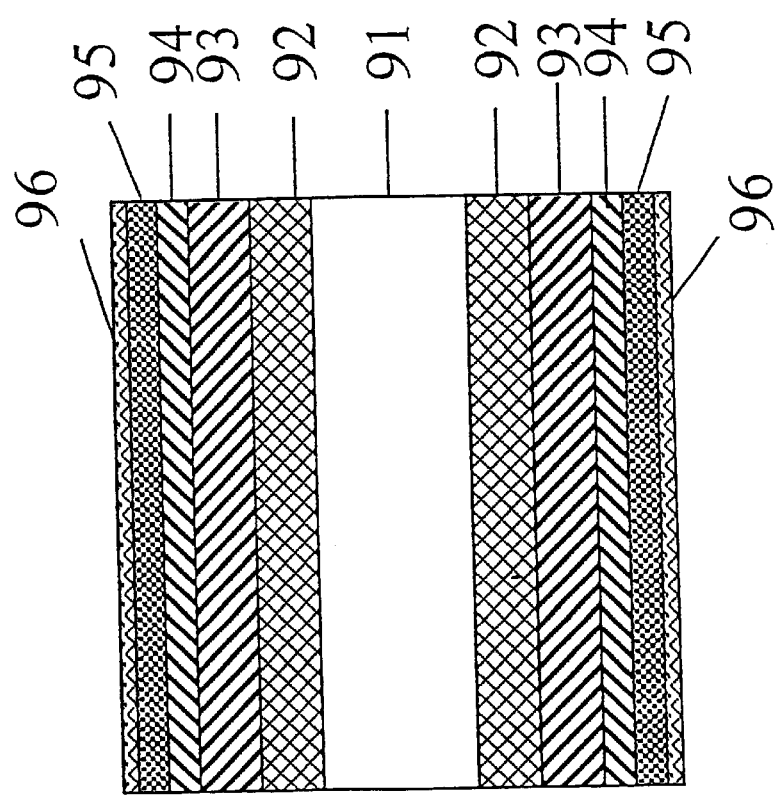
Figure 2:
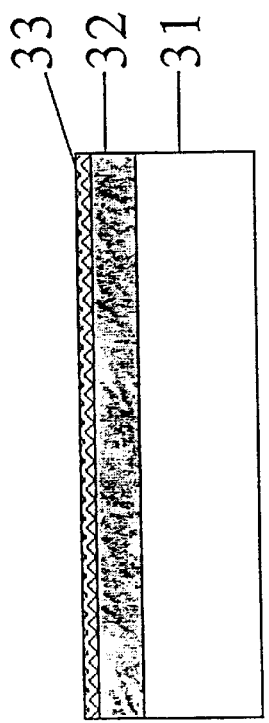
Figure 2:
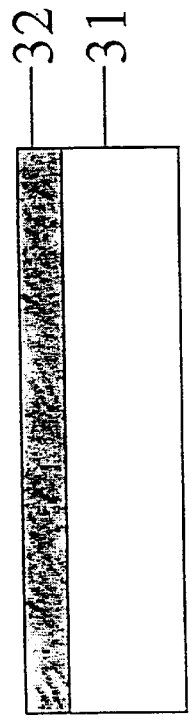
Figure 2:
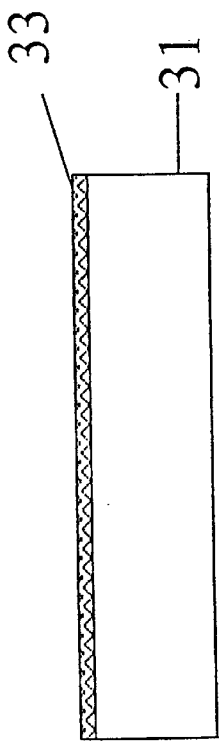
Figure 2:
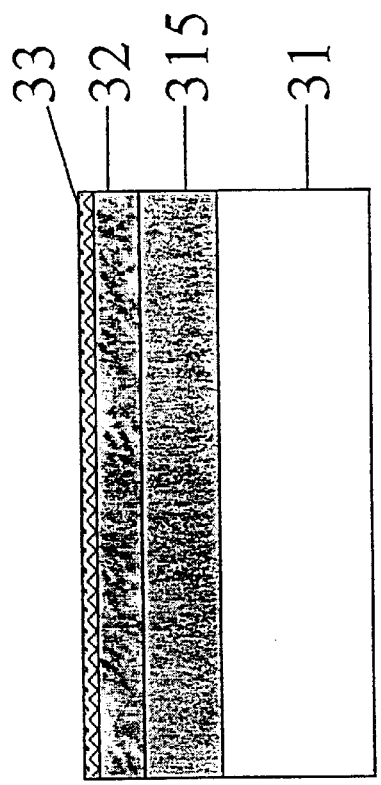
Figure 2:
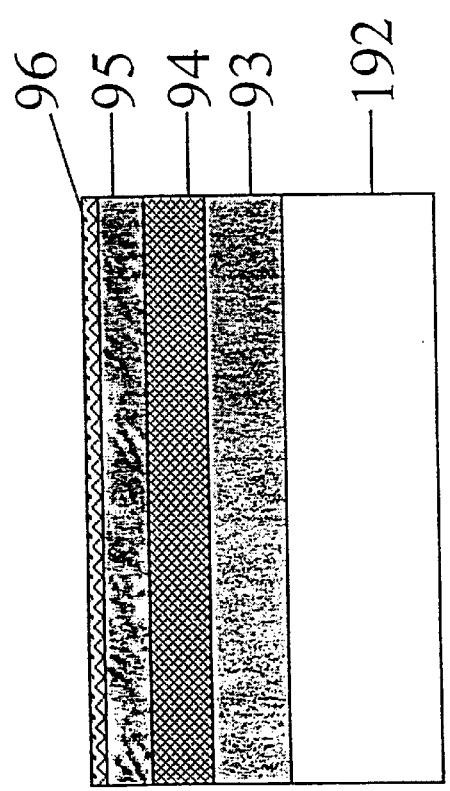

Referring to FIG. 2(a) a real magnetic disk comprises an Al—Mg substrate 91 with a thickness of 0.78~1.3 mm, a Ni—P layer 92 with a thickness of 2~20 $\mu$m, a Chromium underlayer 93 with a thickness of 20~100 nm, a CoXY (X=Pt,Ta; Y=Cr,Ni) magnetic layer 94 with a thickness of 25~150 nm a diamond-like carbon DLC protective layer 95 with a thickness of 3~40 nm, and a liquid lubricant layer 96 with a thickness of 1~4 nm.

Another type of magnetic thin film disk comprises a glass substrate 191 instead of an Al—Mg substrate and Ni—P layer as shown in FIG. 2(b).

Schematic cross-sections through some disks embodying the present invention are shown in FIG. 2(c) to FIG. 2(g). Referring to FIG. 2(c), the disk 30 comprises a conventional transparent glass or quartz disk substrate 31, as used in the commercial flying height tester, upon which is deposited a thin film layer on one side. The thin film layer comprises a protective layer 32 formed on one side of the substrate and a lubricant layer 33 formed on he protective layer 32. Preferably, the protective layer is comprises of the diamond-like carbon (DLC), same as the material used for the protect coating in a real magnetic recording thin film media. The thickness of the protective layer is around 3~40 nm, also same as the thickness of the protective coating in a real magnetic recording thin film media. The materials of lubricant layer is preferably same as that of the real magnetic recording thin film disk, such as PFPE (Perfluoropolyether). The bonding process of the lubricant layer on the overcoat surface is also same as that of a real magnetic recording thin film disk. The thickness of the lubricant layer 35 is also same as that of a real magnetic recording thin film disk, such as 1~4 nm. In general, the process of lubricant bonding, in which lubricant is added to both sides of a disk, will not affect the measurement results obtained using the above disk.

Another embodiment of the invention for mechanical performance measurement of the slider disk interface, involves a disk comprises of a transparent glass disk substrate 31 and a protective layer 32 such as DLC layer for measuring wear of the protective layer, as shown in FIG. 2(d). The materials and thickness of the protective layer is same as a real magnetic recording thin film disk. The materials and thickness of the protective layer can also be pre-selected for obtaining the high measurement sensitivity and high signal noise ratio.

In another embodiment, the disk comprises a conventional transparent disk 31 and a lubricant layer 33 for measuring transferring process of the lubricant, as shown in FIG. 2(e).

In a further embodiment, the disk comprises a glass substrate 192, with or without texture, the same as a substrate of a real magnetic thin film disk, a magnetic recording layer on one side on the glass disk a protective layer on a surface of the magnetic recording layer, and a lubricant layer on a surface of the protective layer, just as a real magnetic thin film disk except another side is super-smooth without any further layers (or possibly with only a lubricant layer), as shown in FIG. 2(f).

In another embodiment, the disk comprises a conventional transparent disk 31, additional bonding layer 315, a protective layer 32, and a lubricant layer 33, as shown in FIG. 2(g). The additional bonding layer provides a strong and sturdy bonding function between the glass substrate and protective layer. On the other hand, the additional bonding layer also be pre-selected for obtaining the high measurement sensitivity and high signal noise ratio.

Figure 3:
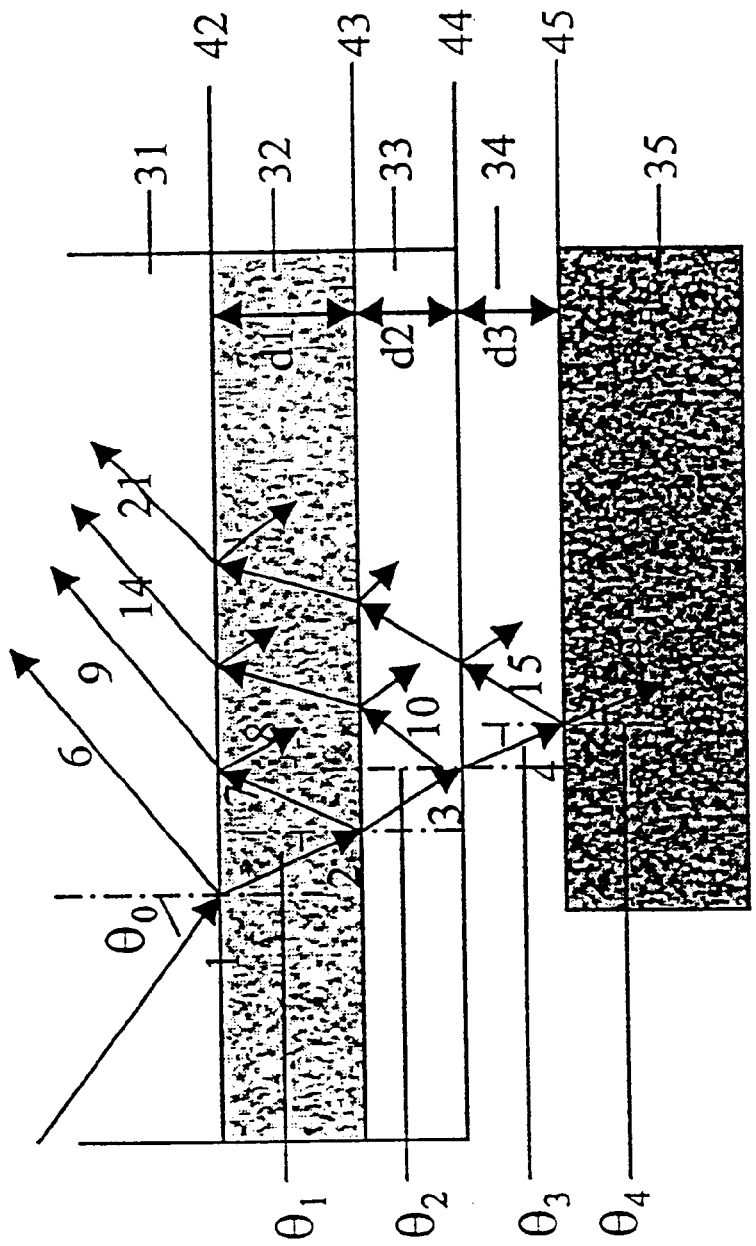
FIG. 3 is a schematic representation of a slider and disk embodying the present invention for use with a measurement method embodying the present invention.

FIG. 3 shows the path of the light through the slider disk interface in more detail than FIG. 1. The light beam 1 passes through the substrate 31 at an angle of $\theta_0$ and is incident upon the top surface of the protective layer 32 at the incident angle $\theta_0$. A portion 2 of beam 1 is refracted into the protective layer 32 at an angle of $\theta_0$ and is incident on the surface of the lubricant layer 33. The other portion 6 of beam 1 is reflected by the interface 42 between the protective layer 32 and the substrate 31 back into the substrate layer 31. The light beam 2 is also similarly divided into two portions when it reaches the interface 43 between the protective layer 32 and the lubricant layer 33. A first part 3 is refracted into the lubricant layer 33 at an angle $\theta_2$. The other portion 7 is reflected by the interface 43 back into the protective layer 32. This portion 7 will also be subject to refraction back into the protective layer 32.

When the light 3 reaches the interface 44 between the lubricant layer 33 and the air gap 34, one part 4 of light 3 is refracted into the air gap 34 at an angle of $\theta_3$ and the other part 10 is reflected back into the lubricant layer 33. The part 4 of light is incident on the surface 45 of the slider 35 at an angle of $\theta_3$. One part 5 of the light 4 enters the slider 35 at a refracted angle $\theta_4$ and is absorbed therein. The other part 15 of light 4 is reflected by the surface 45 of the slider 35 back into the air layer 34.

As would be expected, as light passes through the various layers, both refraction and reflection take place at each interface between respective layers. Further, those parts of the light which have already been refracted and/or reflected are themselves subject to further refraction and reflection at subsequent interfaces.

In accordance within film theory, the intensity of the reflected light $I_{s,p}$ is:

$$I_{s,p} = |\partial_{s,p}|^2 \cdot |r_{s,p}|^2 \tag{1}$$

where $\partial_{s,p}$ is the component which includes the effect of the upper surface of the glass, as well as the effects of any other optical components that have polarization dependence; where $r_{s,p}$ is the reflectance of s and p polarization from the slider-disk interface system and is given by $$r = \frac{m_{11}\eta_0 + m_{12}\eta_0\eta_4 - m_{21} - m_{22}\eta_4}{m_{11}\eta_0 + m_{12}\eta_0\eta_4 + m_{21} + m_{22}\eta_4} \quad (2)$$

where:

$$\eta_i = \sqrt{\frac{\varepsilon_0}{\mu_0}} \eta_i \cos\theta_i \quad i = 0, 1, 2, 3, 4 \text{ for s-polarized light} \quad (3a)$$

$$\eta_i = \sqrt{\frac{\varepsilon_0}{\mu_0}} \frac{\eta_i}{\cos\theta_i} \quad i = 0, 1, 2, 3, 4 \text{ for p-polarized light} \quad (3b)$$

and $m_{11}$, $m_{12}$, $m_{21}$ and $m_{22}$ are all elements of a characteristic matrix (M):

$$M = \begin{vmatrix} m_{11} & m_{12} \\ m_{21} & m_{22} \end{vmatrix} \quad (4)$$

Each layer 32,33,34 has its own characteristic matrix $M_1, M_2, M_3$ such that the resultant characteristic matrix of the multilayered disk is given by:

$$M = M_1 M_2 M_3 \quad (5)$$

The characteristic matrix $M_1, M_2, M_3$ of each layer relating the interference patterns at the two boundaries of the respective layer comprises:

$$M_i = \begin{vmatrix} \cos(\delta_i) & j*\sin(\delta_i)/\eta_i \\ j*\eta_i\sin(\delta_i) & \cos(\delta_i) \end{vmatrix} \quad i = 1, 2, 3 \quad (6)$$

where $$\delta_i = \frac{2\pi}{\lambda} n_i d_i \cos\theta_i \quad i = 1, 2, 3 \quad (7)$$

where $n_0, n_1, n_2, n_3$ and $n_4$ denote the complex refraction coefficients of the conventional transparent layer 31, the protective layer 32, the lubricant layer 33, the air layer 34 and the magnetic head slider 35, respectively. $\lambda$ is the wavelength of the incident light. d1, d2 and d3 represent the thicknesses of the respective layers: the protective layer 32; the lubricant layer 33; and the air layer 34 (the flying height). The flying height, d3, the lubricant film thickness d2, and protective layer thickness d1 are to be measured.

Finally, the phase shift upon reflection is given by:

$$\rho_{s,p} = \tan^{-1}\left[\frac{\text{Im}(r_{s,p})}{\text{Re}(r_{s,p})}\right] \quad (8)$$

Then, the phase difference is given by:

$$\phi(x,y) = \rho_s - \rho_p + \xi \quad (9)$$

where, $\xi$ is the phase difference of the other optical components and corresponds to the reflected component $\partial_{s,p}$.

According to equations 1 to 9, the intensity and phase difference of the reflected light is dependent on the following parameters: the wavelength $\lambda$ of the incident light; the refraction coefficients of the substrate layer 31, the protective layer 32, the lubricant layer 33, the air layer 34 and the slider 35; and the thicknesses of the protective layer (d1), the lubricant layer (d2) and the flying height (d3).

The materials used to manufacture the slider 35 and each layer of the disk are known, a typical slider material being $Al_2O_3$—TiC. Similarly, the wavelength of the incident light, the incident angle and the various refractive and reflective properties of the various materials are known. Thus, the reflective light intensity and phase difference will be dependent upon the thicknesses of the protective layer 32, the lubricant layer 33 and the flying height.

Considering the equations (1) and (9), when $I_s$, $I_p$ and $\phi$ are detected, if the protective layer thickness d1 is known, then the above equations contain two unknowns, that is the thickness of the lubricant layer (d2) and the flying height (d3). The intensities $I_s$, $I_p$ and $\phi$ together provide sufficient information to determine the lubricant film thickness d2 and the slider disk spacing d3.

Figure 5:
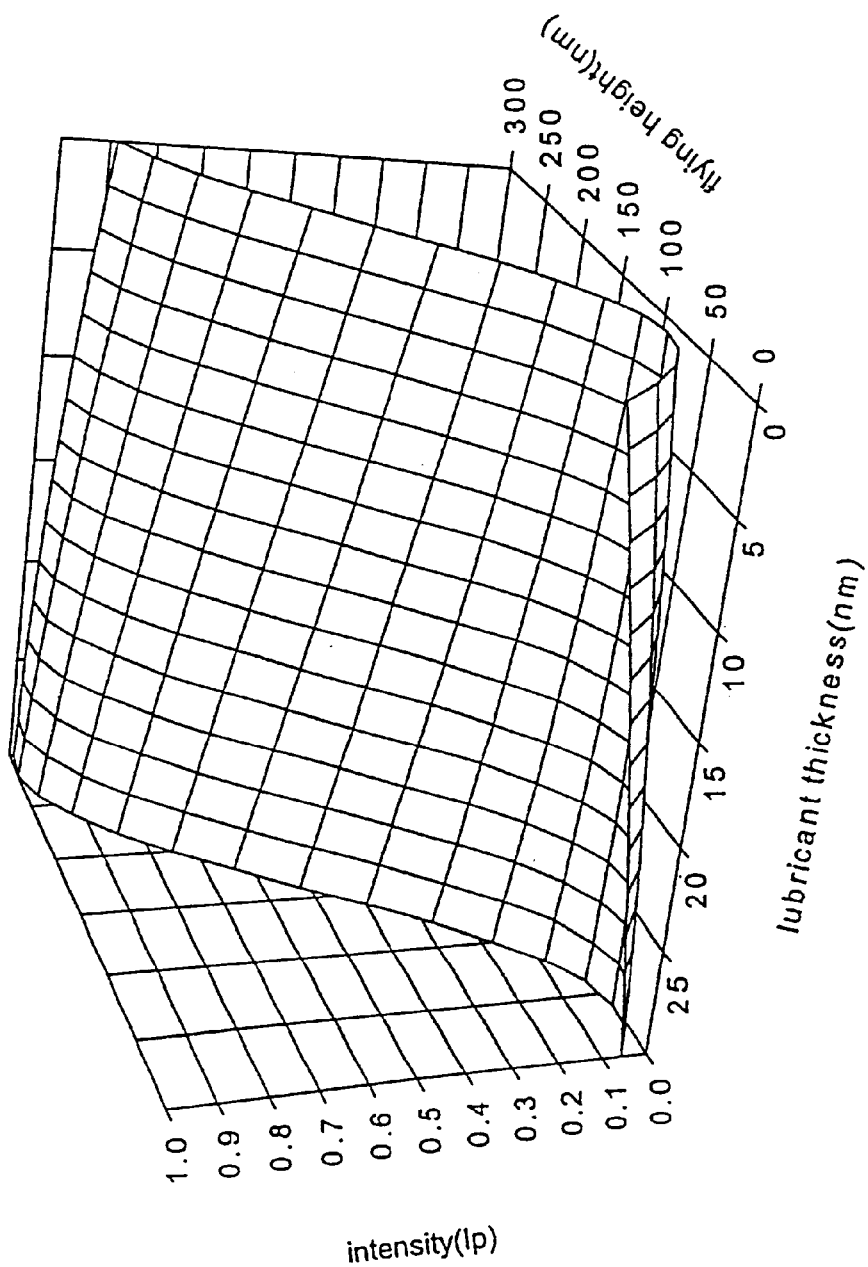
FIG. 5 is a graph showing how the intensity of the p-polarisation varies with respect to the lubricant film thickness and the slider-disk spacing.
Figure 6:
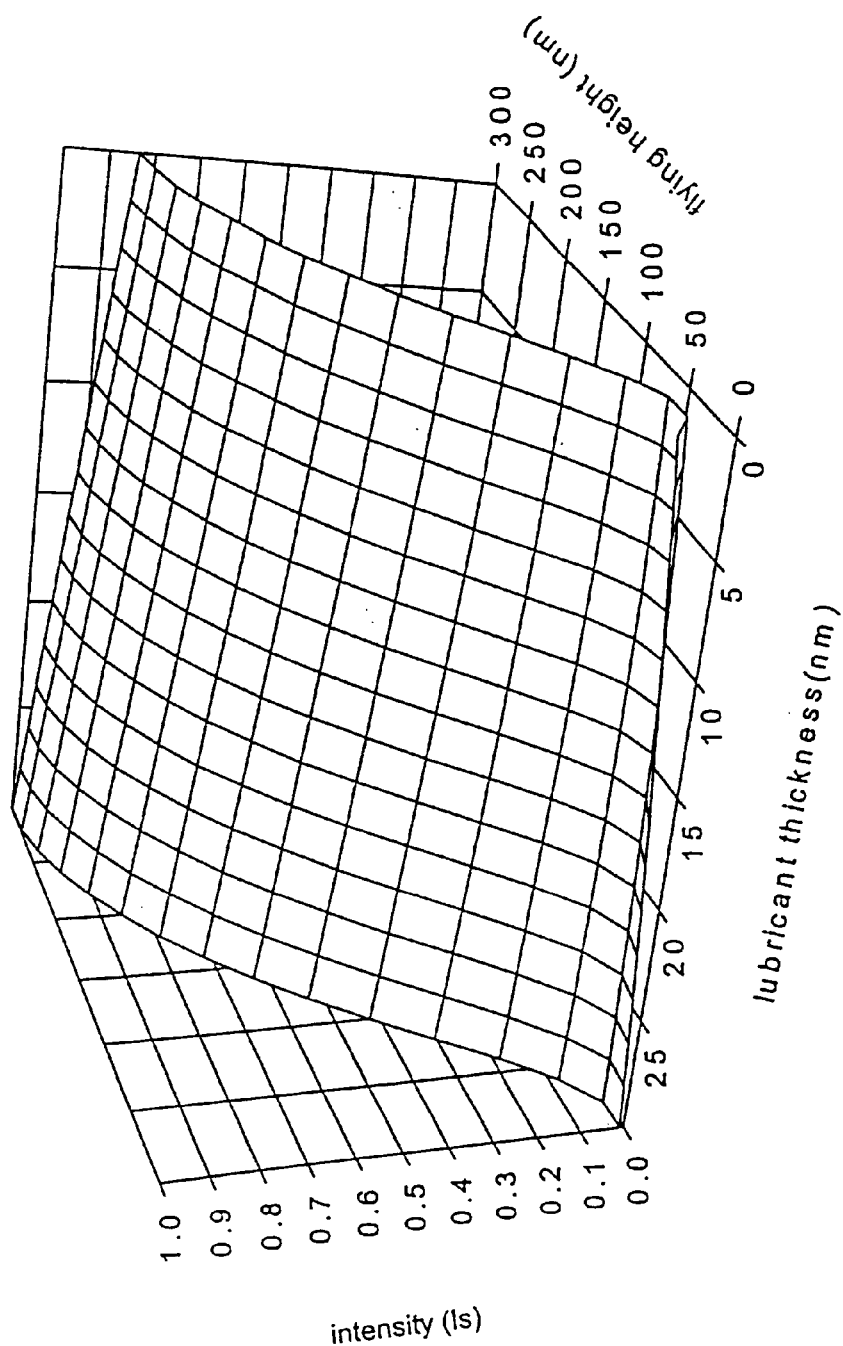
FIG. 6 is a graph showing how the intensity of the s-polarisation varies with respect to the lubricant film thickness and the slider-disk spacing.
Figure 7:
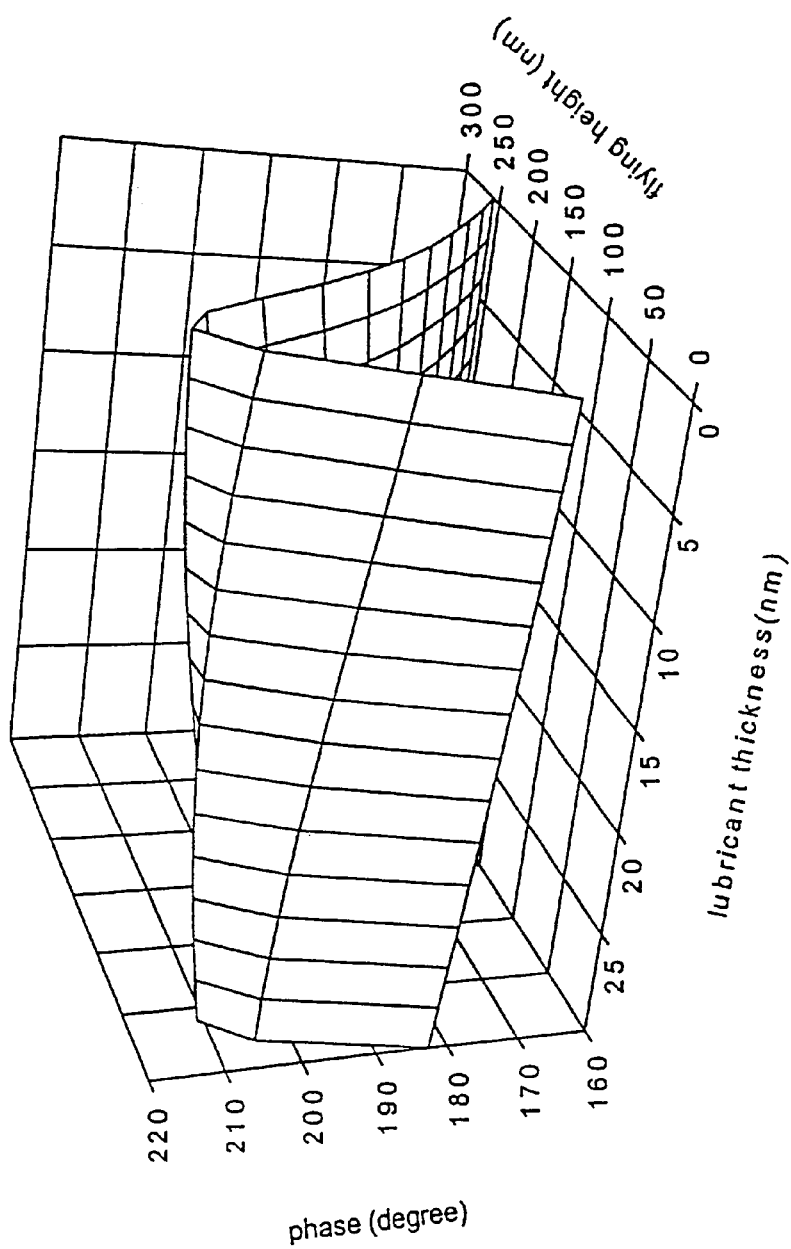
FIG. 7 is a graph showing how the relationship between the phase difference of the reflected light varies with respect to the lubricant film thickness and the slider-disk spacing.

FIG. 5 illustrates how the intensity of s-polarization reflected light is a function of the thickness of both the flying height and the lubricant layer at a specified thickness of the protective layer. FIG. 6 is a graph showing how the intensity of the s-polarization varies as a function of the lubricant film thickness and the flying height. FIG. 7 is a graph showing the relationship between the phase difference of the reflected light varies as a function of the lubricant film thickness and the slider-disk spacing. Here it is assumed that the complex refraction coefficients of the thin film do not vary with the thickness of the thin film. For this example, the complex refraction coefficients of the substrate (glass), the protective layer (Diamond-like Carbon), lubricant layer (PEPF), the air layer, and the slider ($Al_2O_3$—TiC) are 1.5, 2.42+j*0.51, 1.3, 1.0, and 2.2+j*0.5 respectively.

When the light beam comprises multiple wavelength light, then the $I_s$, $I_p$ and $\phi$ for each wavelength are detected. Thus more information is provided to the data processing equipment so that the thickness of the protective layer (d1), lubricant layer (d2) and flying height (d3) can be given by the data processing equipment 61 simultaneously.

Figure 4:
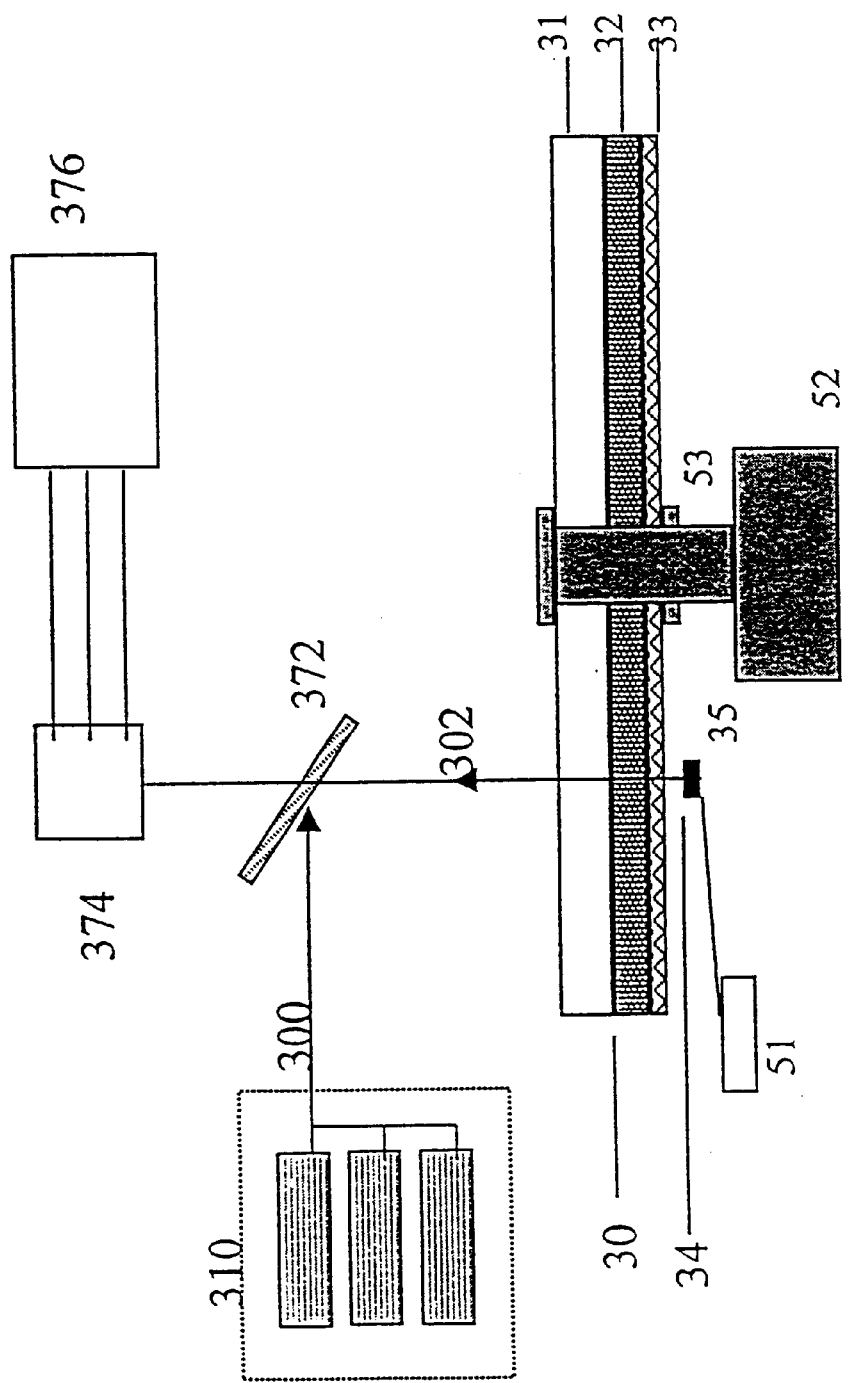
FIG. 4 is a schematic diagram showing another embodiment of the present invention for measuring thin film thickness in the slider-disk interface.

Referring to FIG. 4, there is disclosed a method in which multiple wavelengths of light are used to measure the thickness of the protective layer, the lubricant layer and the air layer based on optical interferometry. The light 300 which comprises multiple wavelength monochromatic light, emitted from a light source 310 which are lasers, a mercury arc lamp, or a Xenon lamp, is input to a beam splitter 372 and is thereby directed to the slider-disk interface which comprises: the disk 30, (having a substrate layer 31, a protective layer 32, and a lubricant layer 33); the air gap 34; and the slider 35. The reflected light 302 from the head disk interface enters the detector component 374, which converts the light intensity into electrical signals that are inputted into a computer 376.

The detector component 374, measures the various intensities of the reflected light at different wavelengths. The light intensity is dependent on the refraction coefficients and the thickness of each layer. If the optical constants of the layers are known, then the intensity is dependent on the physical thickness of the air layer, lubricant layer and protective layer.

Methods embodying the present invention can be used to map the full slider-disk spacing between the air-bearing surface of a slider and disk. Methods embodying the present invention can also map the lubricant distribution between the slider disk by stopping the slider on the surface of the static disk.

Variations on the above described embodiments are envisaged in which the multilayer thin film comprising the protective layer and the lubricant layer are supplemented with further layers. Additionally, the protective layer can itself comprise a multilayer structure.

It will be appreciated that the principle advantages of the present method and apparatus are that the slider disk interface is illuminated directly, and the disk simulates the mechanical performance of a real magnetic disk. So the wear of the protective layer, the lubricant film thickness and the slider-disk spacing can be measured directly between the air-bearing surface of the slider and disk.

What is claimed is:

1. A method of in-situ monitoring of slider-lubricant-disk interaction a slider disk interface comprising the steps of:
    providing a beam of light;
    providing a slider disk interface comprising:
        a disk having a substantially transparent substrate and a thin film layer the thin film layer comprising a protective layer on one side of the substrate and a lubricant layer on the protective layer, the protective layer and the lubricant layer are of the same material composition as those of a real disk, the protective layer and the lubricant layer forming a slider-disk interface similar to the interface formed by a slider and a real magnetic disk, but the thickness of the protective layer is selected to be as thin as possible while providing enough bonding energy to the lubricant layer;
        a slider for carrying a read/write element, the slider having a reflective surface and an air bearing having a thickness for supporting the slider above the disk;
    directing the beam of light to the slider disk interface through the disk, the thin film layer, the air bearing and then to the reflective surface of the slider; and measuring one of the intensity and phase information of the light reflected from the slider disk interface to provide an indication of the thickness of at least one of the air bearing cushion and the thin film layer.

2. A method according to claim 1, wherein the light beam further includes multiple wavelengths of light for obtaining higher measurement accuracy.

3. A method according to claim 1, wherein the protective layer is diamond-like carbon.

4. A method according to claim 1, wherein the lubricant layer is PFPE (perfluoropolyether).

5. A method according to claim 1, wherein the substrate is the same substrate as that used in a real magnetic recording thin film disk.

6. A method according to claim 1, further comprising an anti-reflective material formed on the side of the substrate that is furthest from the slider.

7. A disk for use in at least one of the measurement of the flying height of a slider and monitoring a slider disk interface comprising:
    a transparent disk as a substrate and
    a thin film layer formed on one side of the disk adjacent the slider,
    wherein the film layer comprises
        a protective layer and
        a lubricant layer on the protective layer,
        the protective layer and the lubricant layer forming a slider-disk interface similar to the interface formed by a slider and a real magnetic disk, the thickness of the protective layer is selected to be as thin as possible while providing enough bonding energy to the lubricant layer.

8. A disk according to claim 7, wherein the substrate comprises a glass or quartz substrate with a smooth surface.

9. A disk according to claim 7, wherein the substrate is the same substrate as that used in a real magnetic recording thin film disk.

10. A disk according to claim 7, further comprising an anti-reflective material formed on the side of the substrate that is furthest from the slider.

11. An apparatus for measuring flying height and monitoring the slider-disk interface, comprising a light source to direct a light beam through a disk according to claim 7 and means to measure at least one of the intensity and phase information fo at least one of light reflected back from the disk and light passed through the disk.

12. A disk for use in at least one of the measurement of the flying height of a slider and monitoring a slider disk interface comprising:
    a transparent disk,
    a magnetic recording layer formed on one side of the substrate,
    a protective layer formed on the surface of said magnetic recording layer, and
    a lubricant layer formed on the surface of said protective layer,
    the thickness of protective layer and magnetic layer are selected to be as thin as possible while still reflecting the interface effect between the lubricant layer and protective layer, and that between the magnetic layer and the protective layer.

13. A disk according to claim 12, wherein the materials and thickness of the magnetic recording layer are selected to be the same as that of a real magnetic recording thin film disk.

14. A disk according to claim 12, wherein the thickness of the magnetic recording layer, the protective layer and the lubricant layer are selected to simulate a real magnetic recording thin film disk.

15. A disk according to claim 12, wherein the protective layer is diamond-like carbon.

16. A disk according to claim 12, wherein the lubricant layer is PFPE (perfluoropolyether).

17. An apparatus for measuring flying height and monitoring the slider-disk interface, comprising a light source to direct a light beam through a disk according to claim 12, and means to measure at least one of the intensity and phase information of at least one of light reflected back from the disk and light passed through the disk.

* * * * *